T. S. PAGE.
KITCHEN-UTENSILS.
No. 170,295. Patented Nov. 23, 1875.
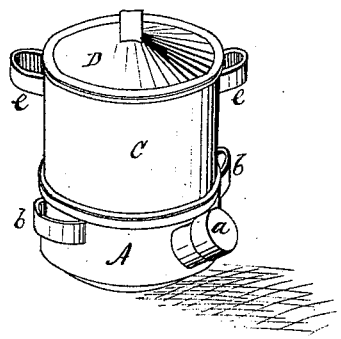
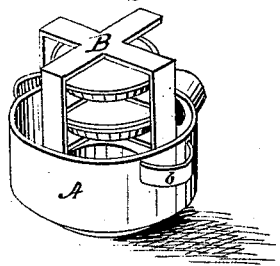
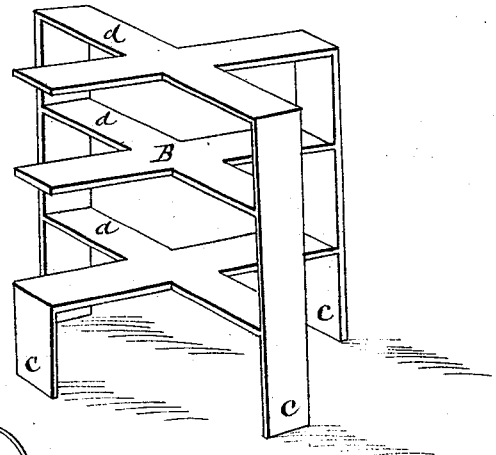
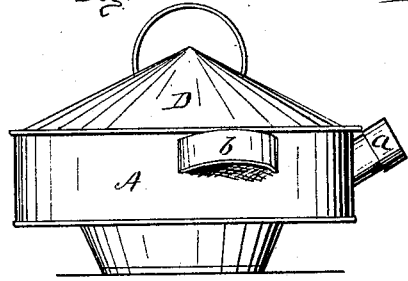
Witnesses:
F. B. Townsend.
D. G. Weems.
Inventor:
Thomas S. Page
per attys.
A. H. Evans & Co

UNITED STATES PATENT OFFICE.

THOMAS S. PAGE, OF TOLEDO, OHIO.

IMPROVEMENT IN KITCHEN UTENSILS.

Specification forming part of Letters Patent No. 170,295, dated November 23, 1875; application filed November 3, 1875.

*To all whom it may concern:*

Be it known that I, THOMAS S. PAGE, of Toledo, Ohio, have invented a new and useful Improvement in Kitchen Utensils, of which the following is a clear, full, and exact description, reference being had to the accompanying drawings making a part of this specification, in which—

Figure 1 is a perspective view of my invention. Fig. 2 is a similar view with the top and shell removed. Fig. 3 is a separate view of the plate-rack. Fig. 4 is a side elevation of the lower section with the top fitted thereon.

My invention relates to that class of kitchen utensils designed for cooking by steam, or for keeping plates or other articles warm; and it consists in the combination of devices hereinafter described and claimed.

To enable others skilled in the art to make and use my invention, I will proceed to describe the exact manner in which I have carried it out.

In the drawings, A is a vessel made of tin, or other suitable material, with a bottom fitting in one of the holes of a cooking stove or range, and provided with the spout $a$ for conveniently emptying or filling the same, and with handles $b\ b$ for lifting or handling the vessel. Within this vessel A is fitted the rack B, constructed as shown in Fig. 3, and provided with legs $c\ c$, which rest on the inside of the bottom of A. It is also provided with the racks or shelves $d\ d$, for holding any article to be cooked or warmed. The number of these racks is only limited by the height of the shell C, which is passed over it, and rests upon the top of the vessel A, on which it is securely held by means of a shoulder, and a flange which fits snugly within the upper rim of the vessel A. The shell C is also provided with handles $e\ e$, for conveniently lifting and handling the same. On the shell C is fitted the top D, which also fits on the vessel A, when the shell and rack are removed, as shown in Fig. 4.

It is evident from this description, that my device may be used for cooking food, or warming plates, and other articles, by placing the rack in position and inclosing it by means of the shell and the top, or the rack may be removed with the shell, and the top placed on the vessel A, whereby it would become a convenient and useful kitchen utensil of itself.

Having thus described my invention, what I claim as new, and desire to secure by Letters Patent, is—

A kitchen utensil consisting of the vessel A and top D, in combination with the rack B, provided with the legs $c\ c$, and shelves $d\ d$, and the shell C, all constructed to operate substantially as and for the purpose set forth.

THOMAS S. PAGE.

Witnesses:
  A. W. GLEASON,
  R. M. McKEE.